United States Patent
Ryu et al.

(10) Patent No.: US 10,817,099 B2
(45) Date of Patent: Oct. 27, 2020

(54) MOBILE TERMINAL HAVING TOUCHSCREEN WITH PRESSURE SENSING HEAT RADIATION LAYERS

(71) Applicant: LG ELECTRONICS INC., Seoul (KR)

(72) Inventors: Sangjo Ryu, Seoul (KR); Byungki Kim, Seoul (KR); Haengchul Kwak, Seoul (KR); Sangkuk Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/328,987

(22) PCT Filed: Sep. 20, 2016

(86) PCT No.: PCT/KR2016/010448
§ 371 (c)(1),
(2) Date: Feb. 27, 2019

(87) PCT Pub. No.: WO2018/043790
PCT Pub. Date: Mar. 8, 2018

(65) Prior Publication Data
US 2019/0196641 A1    Jun. 27, 2019

(30) Foreign Application Priority Data
Aug. 29, 2016   (KR) .................. 10-2016-0110197

(51) Int. Cl.
*G06F 3/041*    (2006.01)
*H04M 1/02*    (2006.01)
(Continued)

(52) U.S. Cl.
CPC ...... *G06F 3/0414* (2013.01); *G02F 1/133308* (2013.01); *G06F 3/041* (2013.01);
(Continued)

(58) Field of Classification Search
CPC .... G06F 3/0414; G06F 3/04144; G06F 3/041; G06F 3/044; G06F 2203/04104;
(Continued)

(56) References Cited

U.S. PATENT DOCUMENTS

2013/0082970 A1*   4/2013   Frey ............... G06F 3/0414
                                                     345/173
2014/0092561 A1    4/2014   Chen et al.
(Continued)

FOREIGN PATENT DOCUMENTS

CN    105445988 A    3/2016
CN    205139869 U    4/2016
(Continued)

*Primary Examiner* — Darlene M Ritchie
(74) *Attorney, Agent, or Firm* — Birch, Stewart, Kolasch & Birch, LLP

(57) ABSTRACT

A mobile terminal including a window; a touch screen sensing a touch input applied to the window and outputting visual information; and an internal frame supporting a lower portion of the touch screen. Further, the touch screen includes a display module outputting the visual information; at least one heat dissipation layer disposed below the display module to dissipate heat; and a pressure sensing part including a ground layer and a pressure sensing layer spaced apart from each other with the at least one heat dissipation layer interposed therebetween and to sense a pressure of the touch input based on a change in capacitance according to a deformation of the at least one heat dissipation layer while the touch input is being applied. In addition, the ground layer is adjacent to the display module or the internal frame.

18 Claims, 13 Drawing Sheets

(51) Int. Cl.
*G02F 1/1333* (2006.01)
*G06F 3/044* (2006.01)

(52) U.S. Cl.
CPC .............. *G06F 3/044* (2013.01); *H04M 1/02* (2013.01); *H04M 1/0202* (2013.01); *G06F 2203/04104* (2013.01); *H04M 2201/38* (2013.01); *H04M 2250/22* (2013.01)

(58) Field of Classification Search
CPC .. H04M 1/02; H04M 1/0202; H04M 2201/38; H04M 2250/22; B32B 9/04; B32B 9/041; B32B 15/095; B32B 2307/302; G02F 1/133308; G02F 1/13332; G02F 1/13331; G02F 1/13338
See application file for complete search history.

(56) References Cited

U.S. PATENT DOCUMENTS

| | | | |
|---|---|---|---|
| 2015/0370396 A1* | 12/2015 | Hotelling | G06F 3/0414 345/174 |
| 2016/0098131 A1* | 4/2016 | Ogata | G06F 1/1643 345/173 |
| 2016/0103544 A1* | 4/2016 | Filiz | G06F 3/0414 345/174 |
| 2016/0162093 A1 | 6/2016 | Kim et al. | |
| 2016/0188039 A1* | 6/2016 | Yoon | G06F 3/044 345/174 |
| 2016/0202800 A1* | 7/2016 | Itaya | G06F 3/044 345/174 |
| 2016/0231852 A1 | 8/2016 | Moon et al. | |
| 2016/0299598 A1* | 10/2016 | Yoon | G06F 3/044 |
| 2017/0068348 A1* | 3/2017 | Kemppinen | G06F 3/044 |
| 2017/0068383 A1* | 3/2017 | Chern | G06F 3/0416 |
| 2017/0309843 A1* | 10/2017 | Kim | B32B 3/30 |
| 2018/0004333 A1* | 1/2018 | Jeong | G06F 3/044 |
| 2018/0011519 A1* | 1/2018 | Tang | G06F 1/16 |
| 2018/0196548 A1* | 7/2018 | Kim | G06F 3/044 |

FOREIGN PATENT DOCUMENTS

| | | |
|---|---|---|
| EP | 3035022 A1 | 6/2016 |
| KR | 10-2011-0087153 A | 8/2011 |
| KR | 10-2012-0021812 A | 3/2012 |
| KR | 10-2014-0080596 A | 7/2014 |
| KR | 10-2016-0053906 A | 5/2016 |
| WO | WO 2015/106183 A1 | 7/2015 |

\* cited by examiner

MOBILE TERMINAL HAVING TOUCHSCREEN WITH PRESSURE SENSING HEAT RADIATION LAYERS

CROSS-REFERENCE TO RELATED APPLICATIONS

This Application is the National Phase of PCT International Application No. PCT/KR2016/010448 filed on Sep. 20, 2016, which claims the priority benefit under 35 U.S.C. § 119(a) to Korean Patent Application No. 10-2016-0110197 filed in the Republic of Korea on Aug. 29, 2016, all of which are hereby expressly incorporated by reference into the present application.

BACKGROUND OF THE INVENTION

Field of the Invention

The present disclosure relates to a mobile terminal having a touch screen for sensing a pressure touch input.

Discussion of the Related Art

A mobile terminal includes all the devices which include a battery and a display unit outputting information to the display unit using power supplied from the battery and which users may carry. The mobile terminal includes a device for recording and playing back video, a device for displaying a graphic user interface (GUI), and the like, and includes a notebook, a mobile phone, and glasses, a watch, a game player, and the like, capable of displaying screen information.

Such a mobile terminal has various functions according to the development of technologies. For example, the mobile terminal is implemented in the form of a multimedia device having a plurality of functions such as capturing images or video, playing a music or video file, playing a game, and receiving broadcast. Further, in order to support and enhance the functions of the terminal, improvement of a structural and/or software part of the terminal may be considered.

Recently, as functions of a mobile terminal have been diversified, a pressure sensor for sensing a pressure of a touch input has been developed. However, in order to detect a change in capacitance due to a pressure, a structure or space in which a thickness is deformed due to pressure is required, which increases a thickness of a display unit.

SUMMARY OF THE INVENTION

An aspect of the present disclosure provides a mobile terminal including a touch screen for sensing a pressure touch input while minimizing an increase in thickness of the touch screen.

According to an aspect of the present disclosure, there is provided a mobile terminal including: a window; a display module including a touch screen sensing a touch input applied to the window and outputting visual information, the touch screen outputting the visual information; at least one heat dissipation layer disposed below the display module to dissipate heat; and a pressure sensing part disposed to be adjacent to the heat dissipation layer and sensing a pressure of a touch input based on a change in capacitance according to deformation of the heat dissipation layer while the touch input is being applied.

In an example related to the present disclosure, the display module may include an OLED layer. A first heat dissipation layer may be deformed by an external force, and a second heat dissipation layer may be formed of a metal material and include holes. Thus, while heat generated in the OLED layer is being dissipated, a change in capacitance may be sensed to sense a pressure of a touch input.

In an example related to the present disclosure, a size of the holes is reduced toward the center of the second heat dissipation layer and the number of holes is reduced toward the center, and thus, a pressure may be finely sensed toward the edges of the touch screen. Thus, a pressure may be sensed although displacement against an external force is small in the edge region.

In an example related to the present disclosure, since the adhesive member between the window and the case includes pores so as to be easily elastically deformed, a problem that the window and the case are separated when a pressure touch input is applied may be reduced even when the window and the case are fixed in a narrow space.

According to the present disclosure, the ground layer and the pressure sensing layer are separated using the heat dissipation layer disposed to dissipate heat generated by the OLED module, and a pressure touch input may be sensed based on deformation of the heat dissipation layer according to pressure of the pressure touch input.

Also, since the second heat dissipation layer formed of metal dissipating heat includes a plurality of holes and the region of the holes extend toward the edge, a change in capacitance may be finely sensed even at the edge.

In addition, since the adhesive member bonding the window and the case includes pores, although a region for fixing the window and the case is formed to be narrow, separation between the case and the window due to a pressure touch input may be minimized.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "unit" and "part" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
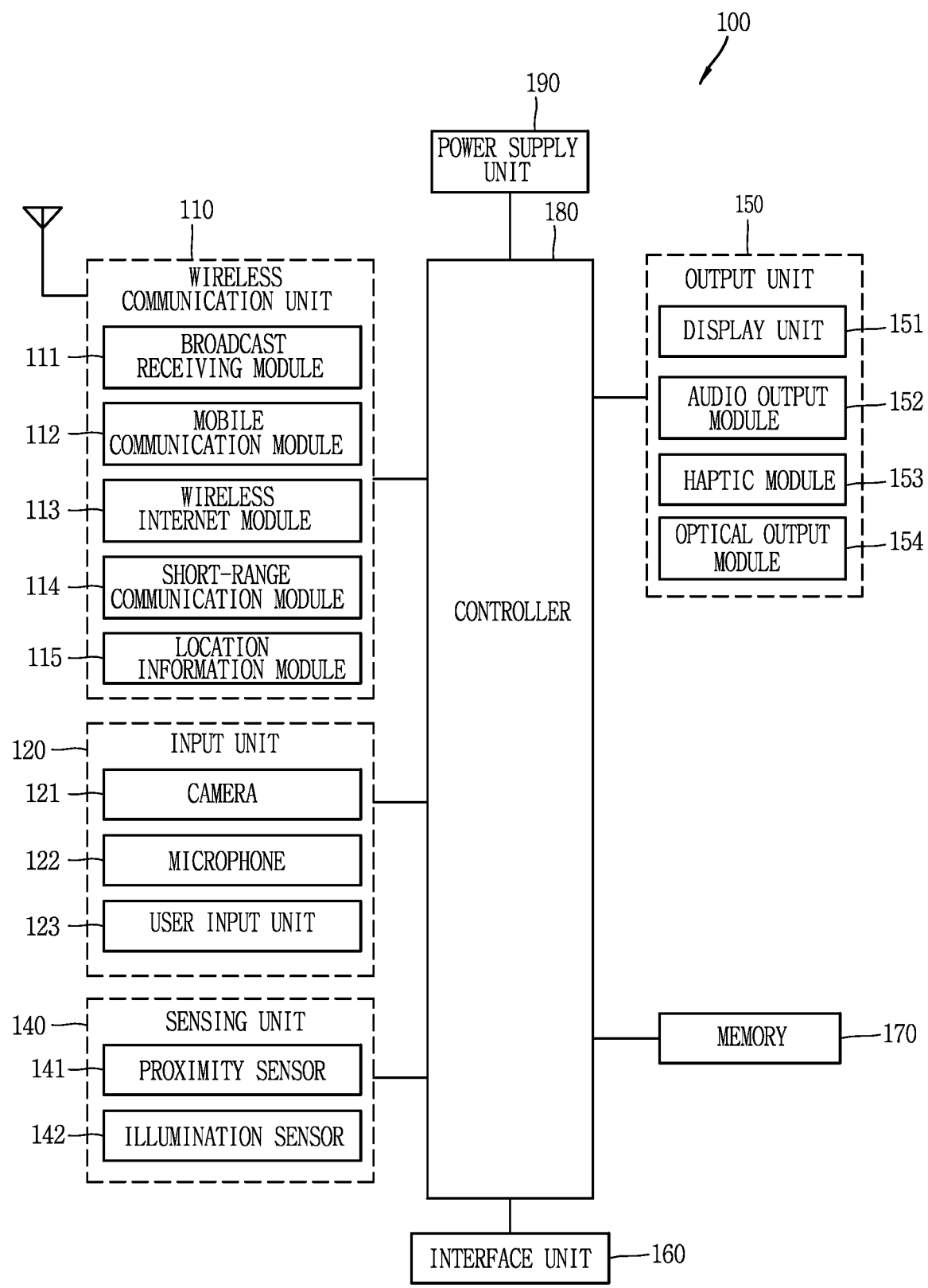
FIG. 1A is a block diagram illustrating a mobile terminal according to the present disclosure.
Figure 1B:
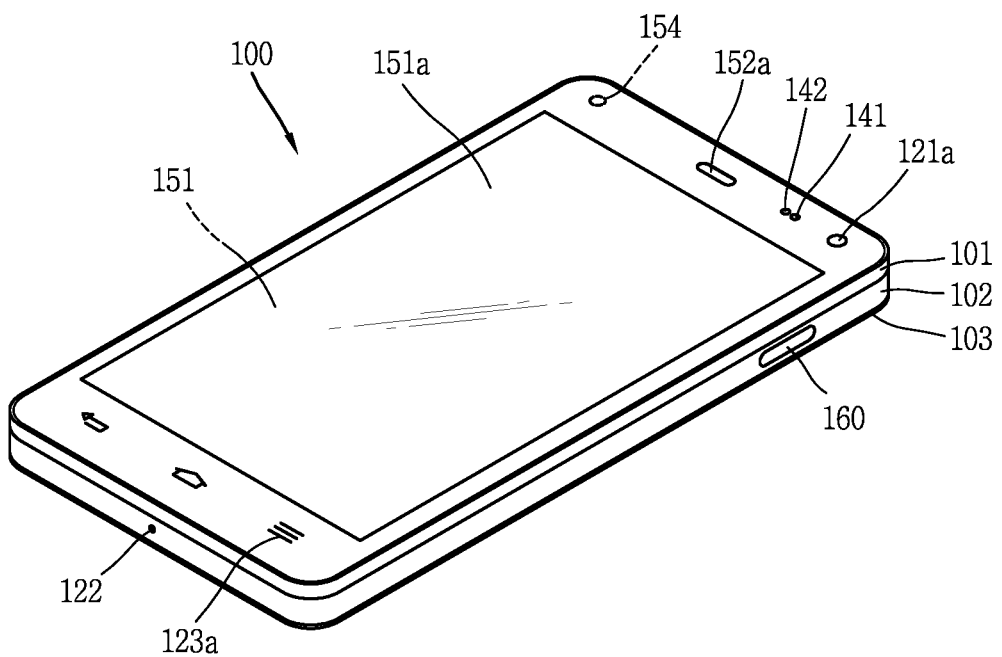
FIGS. 1B and 1C are conceptual views illustrating an example of a mobile terminal according to the present disclosure viewed in different directions.
Figure 1C:
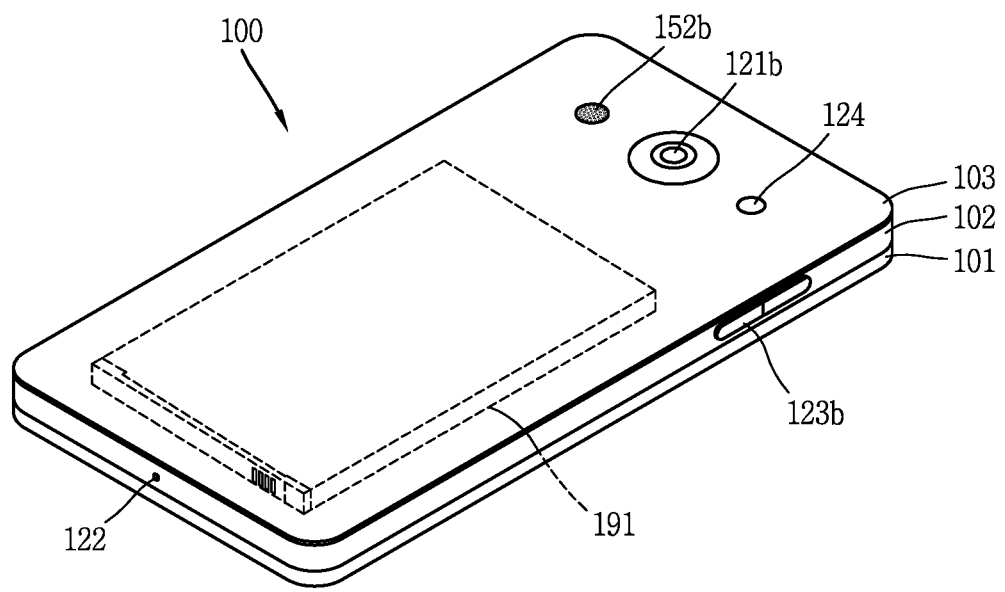

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more units which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more units which connect the mobile terminal 100 to one or more networks. To facilitate such communications, the wireless communication unit 110 includes one or more of a broadcast receiving unit 111, a mobile communication unit 112, a wireless Internet unit 113, a short-range communication unit 114, and a location information unit 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic unit 153, and an optical output unit 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification unit, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

In addition, the controller 180 may control at least some of the components illustrated in FIG. 1A to drive an application program stored in the memory 170. In addition, the controller 180 may combine at least two or more of the components included in the mobile terminal 100 and operate the same to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Hereinafter, the components enumerated above will be described in more detail with reference to FIG. 1A, before explaining various embodiments implemented through the mobile terminal 100 as described above.

Regarding the wireless communication unit 110, the broadcast receiving unit 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving units 111 may be utilized to facilitate simultaneously receiving of two or more broadcast channels, or to support switching among broadcast channels.

The mobile communication unit 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication unit 112 include audio call signals, video (telephony) call signals, or various formats of data to support communication of text and multimedia messages.

The wireless Internet unit 113 is configured to facilitate wireless Internet access. This unit may be internally or externally coupled to the mobile terminal 100. The wireless Internet unit 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet unit 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet unit 113 performs such wireless Internet access. As such, the Internet unit 113 may cooperate with, or function as, the mobile communication unit 112.

The short-range communication unit 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication unit 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication unit 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication unit 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information unit 115 is generally configured to detect, calculate, derive or otherwise identify a position of the mobile terminal. As an example, the location information unit 115 includes a Global Position System (GPS) unit, a Wi-Fi unit, or both. If desired, the location information unit 115 may alternatively or additionally function with any of the other units of the wireless communication unit 110 to obtain data related to the position of the mobile terminal. As one example, when the mobile terminal uses a GPS unit, a position of the mobile terminal may be acquired using a signal sent from a GPS satellite. As another example, when the mobile terminal uses the Wi-Fi unit, a position of the mobile terminal can be acquired based on information related to a wireless access point (AP) which transmits or receives a wireless signal to or from the Wi-Fi unit.

The input unit 120 may be configured to permit various types of input to the mobile terminal 120. Examples of such input include audio, image, video, data, and user input. Image and video input are often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well. Here, the terminal body can be understood as a concept of referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification unit, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output unit 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output unit 152a, the second audio output unit 152b, the proximity sensor 141, the illumination sensor 142, the optical output unit 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output unit 152a, the proximity sensor 141, the illumination sensor 142, the optical output unit 154, the first camera 121a and the first manipulation unit 123a are arranged on the front surface of the terminal body. The second manipulation unit 123b, the microphone 122 and the interface unit 160 are arranged on the side surfaces of the terminal body. The second audio output unit 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output unit 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output unit 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output unit 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output unit 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output units 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output units 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Unit (SIM), User Identity Unit (UIM), or a memory card for information storage.

A second display unit 251 is disposed on a rear surface of the terminal body. Thus, an additional rear camera and a flash may not be disposed on the rear surface of the terminal body. The second audio output unit 152b can be located on the rear surface of the terminal body. The second audio output unit 152b may implement stereophonic sound functions in conjunction with the first audio output unit 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving unit 111 (refer to FIG. 1A) may be retractable into the terminal body. Alternatively, an antenna may be formed using a film attached to an inner surface of the rear cover 103, or a case that includes a conductive material.

A power supply unit 190 (See FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that can be implemented in the mobile terminal configured as above will be described with reference to the accompanying drawings. It will be apparent to those skilled in the art that the present invention may be embodied in other specific forms without departing from the spirit or essential characteristics thereof.

Figure 2:
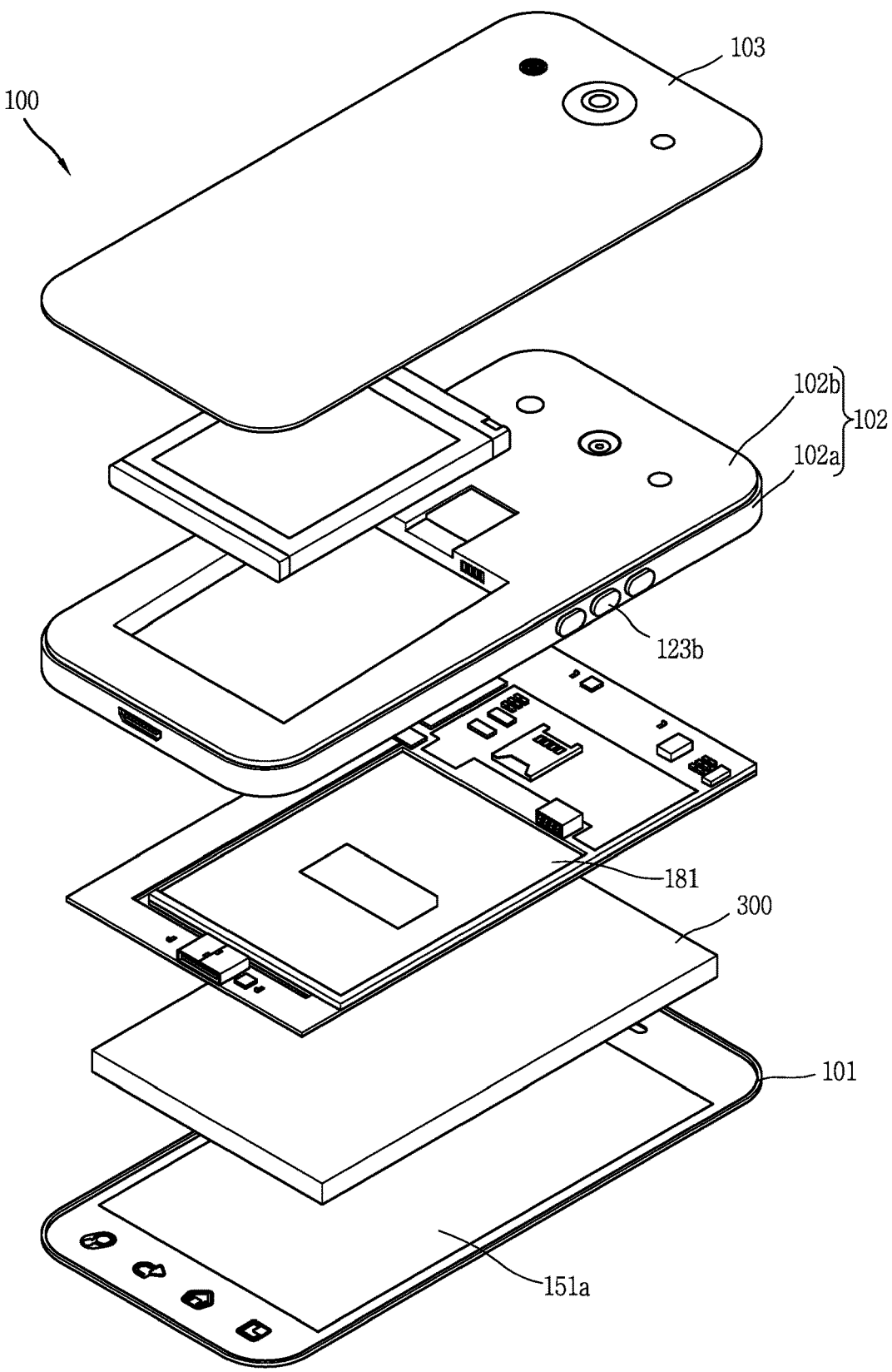
FIG. 2 is an exploded perspective view of a mobile terminal according to a first embodiment of the present disclosure.

FIG. 2 is an exploded perspective view of a mobile terminal 100 according to a first embodiment of the present disclosure. The mobile terminal 100 includes the front case 101 accommodating the window 151a, the touch screen 300 provided under the window 151a, the printed circuit board (PCB) 181 provided under the touch screen 300, the rear case 102 coupled to the front case 101, forming an internal space with the front case 101 and accommodating electronic components (not shown) in the internal space, and the rear cover 103 covering the rear surface of the rear case 102 and forming an appearance of the rear surface of the mobile terminal 100. The rear case 102 includes a main surface portion 102b covering the PCB 181 and a side surface portion 102a formed in a thickness direction of the mobile terminal 100 to form an internal space with the front case 101.

Here, the side surface portion 102a may be formed of a metal material, and the main surface portion 102b may be formed of a plastic material, but is not limited thereto.

Figure 3A:
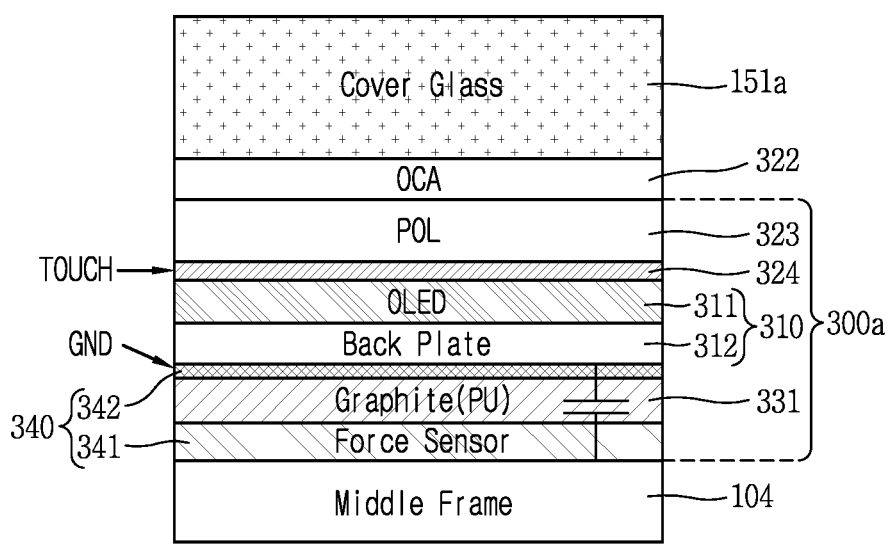
FIGS. 3A and 3B are conceptual views illustrating components of a touch screen for sensing a pressure touch according to an embodiment.
Figure 3B:
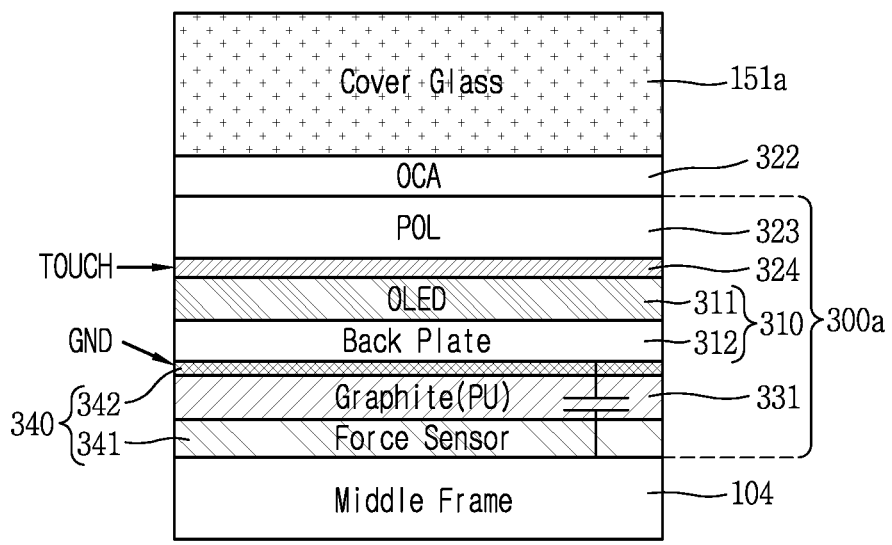
Figure 3B:
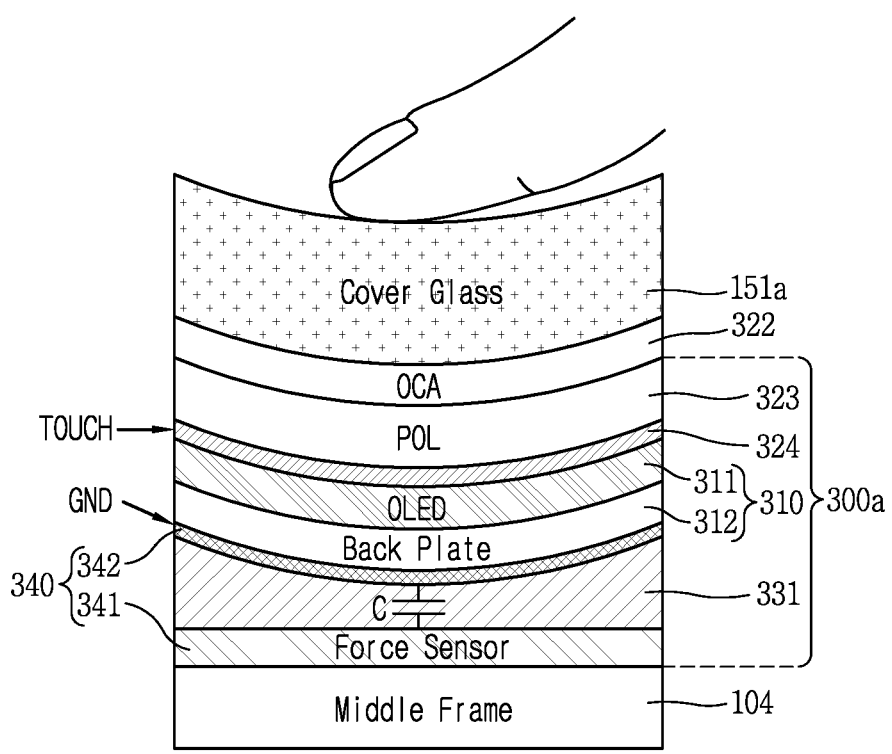
Figure 3C:
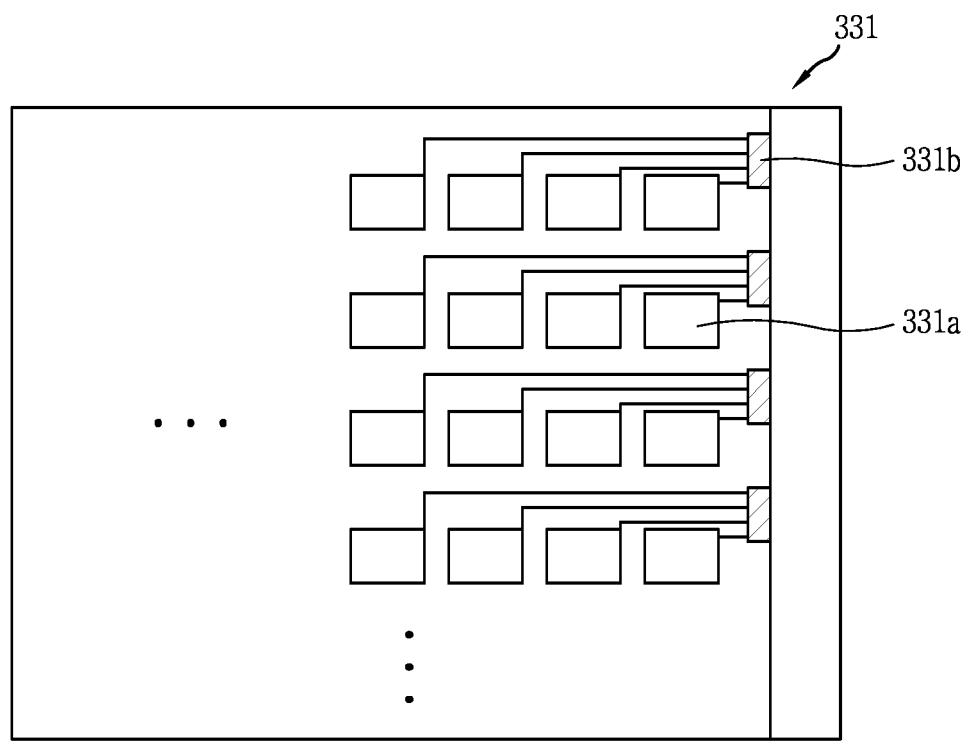
FIG. 3C is a conceptual view for explaining a self-capacitance type touch sensor.

FIGS. 3A and 3B are conceptual views illustrating components of a touch screen that senses a pressure touch according to an embodiment, and FIG. 3C is a conceptual view illustrating a self-capacitance type touch sensor.

Referring to FIGS. 3A and 3B, a first touch screen 300a according to an embodiment of the present disclosure includes a display module 310, a polarizing layer 323, a touch sensing layer 324, a first heat dissipation layer 331, and a pressure sensing part 340.

The first touch screen 300a is attached to the window 151a by an adhesive layer 322. The display module (organic light emitting diode module) 310 includes an OLED layer 311 and a back plate 312 supporting the OLED layer 311. The back plate 312 forms an appearance of the OLED layer 311 and may support a lower surface and a side surface of the OLED layer 311 to prevent deformation. The back plate 312 may be formed of a metal. Although not shown, the first touch screen 300a may include a barrier layer for preventing moisture penetration and compensating for a step in the OLED module.

A touch sensing layer 324 is formed on the display module 310. The touch sensing layer 324 senses a touch input to the window 151a. Although not specifically shown in the drawing, the touch sensing layer 324 includes a plurality of electrode lines arranged in a crossing direction. When a user's finger touches the window 151a, the touch sensing layer 324 senses the touch input applied through a change in capacitance at the intersecting region of the plurality of electrode lines. Insulation members may be formed so that the intersection regions of the plurality of electrode lines do not contact each other. The plurality of electrode lines may be formed of transparent ITO.

The touch sensing layer 324 including the plurality of intersection regions overlaps a display region of the first touch screen 300a where an image is output, and thus, touch coordinates indicating the touch point may be sensed by the touch sensing layer 324.

In FIG. 3A, the touch sensing layer 324 may be attached to one surface of another component included in the first touch screen 300a or may be formed as an electrode layer formed on one surface so as to be integrally formed with the first touch screen 300a but is not limited thereto. For example, the touch sensing layer 324 may be formed on one side of the window 151a or may include a plurality of electrode lines printed on one surface of the window 151a.

Referring to FIG. 3A, the touch sensing layer 324 is formed between the polarizing layer 323 and the display module 311. The display module 311 may be formed of an organic layer including a plurality of self-luminous organic materials and emitting red light, green light, and blue light and a base substrate on both sides. Light emitted from the display module 311 may be output externally through the polarizing layer 323.

A ground layer 342 is disposed under the display module 310. That is, it is disposed under the back plate 312 supporting the OLED layer 311. The ground layer 342 is formed of a conductive material. However, if the back plate 312 is formed of a conductive material, the ground layer 342 may be formed as a ground layer on one surface of the back plate 312.

The window 151*a*, the polarizing layer 323, the touch sensing portion 324, the display module 310, and the ground layer 342 are elastically deformed by an external force applied to the window 151*a*. For example, when pressure is applied by the user's finger while a touch input is being applied to the window 151*a*, the window 151*a*, the polarizing layer 323, the display module 310, and the ground layer 342 are bent downward. However, each component is restored to its original shape when the touch input is released due to an elastic force.

The first touch screen 300*a* of the mobile terminal 100 according to the present disclosure includes a pressure touch sensing part 340 that senses a pressure touch having a pressure higher than a specific reference pressure value and being applied to the window 151*a*. The pressure touch sensing part 340 includes the ground layer 342 and the pressure sensing layer 341 which overlaps the ground layer 342 and spaced apart from the ground layer 342. The pressure sensing layer 341 is configured as a self-capacitance type touch sensor that senses a change in capacitance with respect to the ground layer 342.

Referring to FIG. 3C, the pressure touch sensing part 340 includes a plurality of electrodes 331*a*. The plurality of electrodes 331*a* correspond to a plurality of pixels forming a display part of the display module 310, respectively. That is, it senses a change in self-capacitance of each electrode. The sensed capacitance increases when the current is discharged by the user's finger. The plurality of electrodes 331*a* are electrically connected to the electrode pads 331*b*, respectively, to sense a change in capacitance of each electrode.

A first heat dissipation layer 331 is disposed between the pressure touch sensor layer 341 and the ground layer 342. The first heat dissipation layer 331 is formed of an elastically deformable material and absorbs impact applied from the outside, thereby preventing damage to components constituting the first touch screen 300*a*. The first heat dissipation layer 331 may be formed of a material capable of spreading and releasing heat. For example, the first heat dissipation layer 331 may include at least one of a graphite material and a polyurethane (PU) material. For example, the first heat dissipation layer 331 may be formed by attaching a polyurethane sheet to the graphite layer. The polyurethane (PU) material absorbs impacts and vibrations generated from the outside, thereby minimizing damage to the OLED module 310.

Since heat generated by the display module 310 may be diffused to the other region relatively quickly by the first heat dissipation layer 331, a change in temperature of the OLED layer 311 may be prevented and damage to the OLED layer 311 may be minimized.

The first heat dissipation layer 311 is formed to have a predetermined thickness. Since the pressure sensing layer 341 and the ground layer 342 are disposed with the heat dissipation layer 311 having the predetermined thickness interposed therebetween, although a touch input is applied to the window 151*a*, the pressure sensing layer 341 does not sense the touch input. That is, while the touch input is being applied, the pressure sensing layer 341 and the ground layer 342 are separated from each other by a predetermined distance or greater by the first heat dissipation layer 331 and the pressure sensing layer 341 may not detect the change in the capacitance.

Referring to FIG. 3B, when the touch input has a pressure higher than a specific pressure, the window 151*a*, the polarizing layer 323, and the display module 310 are deformed and the first heat dissipation layer 331 is deformed such that a thickness of the first dissipation layer 331 is reduced. As the thickness of the first heat dissipation layer 331 is reduced, a space between the pressure sensing layer 341 and the ground layer 342 is reduced. Accordingly, when the distance between the ground layer 342 and the pressure sensing layer 341 is reduced, a capacitance value is increased, and thus, when the capacitance value is increased, a change in a pressure value of the pressure touch input may be detected.

Accordingly, while the touch input is being applied, the touch sensing part 324 senses coordinates on the first touch screen 300*a* to which the touch is applied. When the touch input corresponds to a pressure touch input having a pressure higher than a specific reference pressure, a portion of the first touch screen 300*a* is deformed and the pressure sensing unit 340 senses the pressure.

The controller 180 may sense a pressure touch input applied to the window 151*a* by the user on the basis of the coordinates sensed by the touch sensing part 324 and the pressure sensed by the pressure sensing part 340. Alternatively, since the pressure sensing layer 341 includes a plurality of electrodes respectively corresponding to the pixels, it may sense the pressure touch input applied to a region corresponding to a specific pixel of an image output by a position of an electrode in which a change in capacitance is sensed.

An internal frame 104 having a small degree of deformation is disposed under the pressure sensing layer 341 to support deformation of the components based on the external force, and since the first heat dissipation layer 331 is formed of a deformable material, the pressure sensing layer 341 is not deformed.

According to the present embodiment, the ground layer 342 and the pressure sensing layer 341 are disposed with a heat dissipation layer interposed therebetween to minimize heat generation of the display module to detect applied pressure according to deformation based on an external force of the heat dissipation layer. Thus, since an additional gap is not formed to sense pressure, internal space may be effectively secured.

Figure 4A:
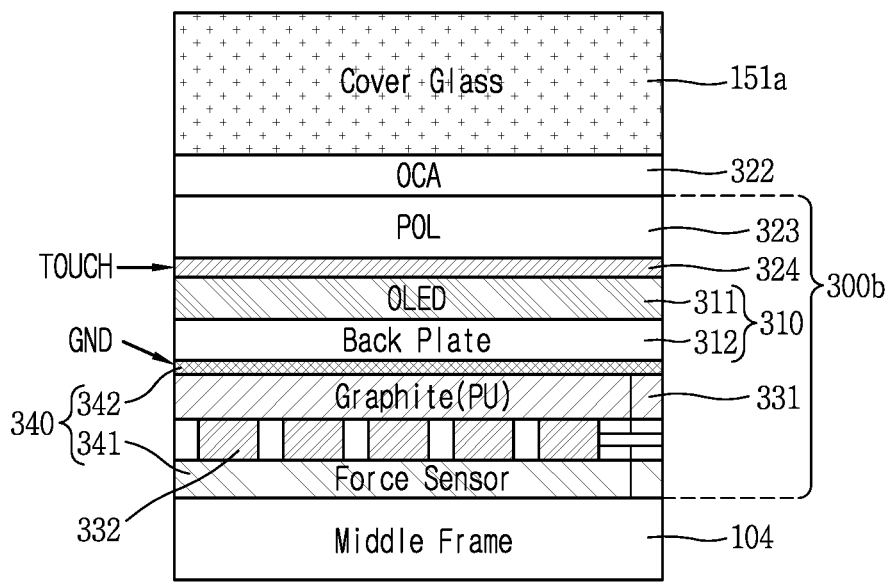
FIG. 4A is a conceptual view illustrating components of a touch screen according to another embodiment.
Figure 4B:
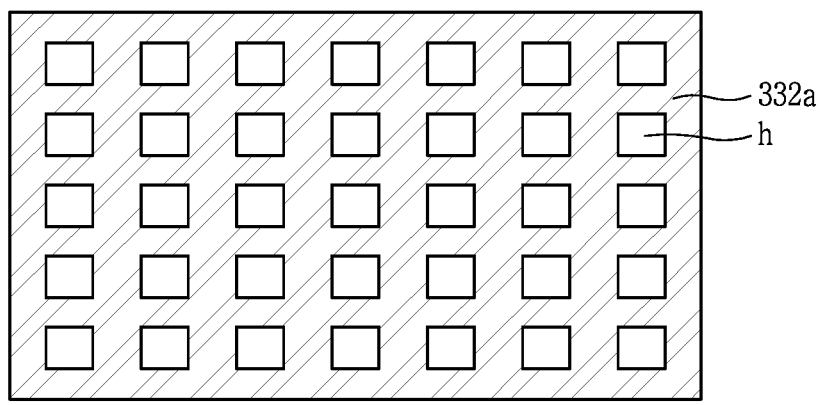
FIG. 4B is a conceptual view for explaining a structure of the second heat dissipation layer.
Figure 4C:
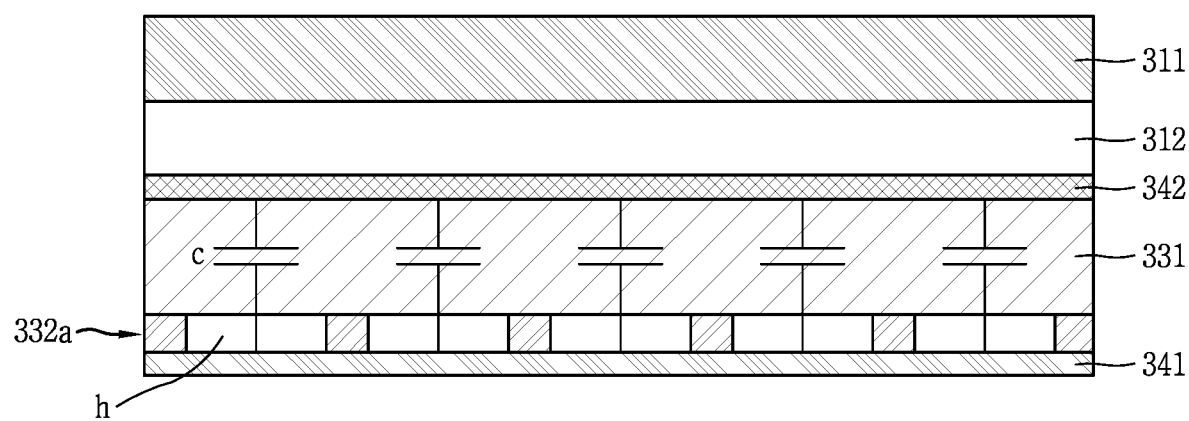
FIG. 4C is a conceptual view for explaining characteristics of detecting a change in capacitance using holes of a second heat dissipation layer.

FIG. 4A is a conceptual view for explaining the components of the touch screen according to another embodiment, FIG. 4B is a conceptual view for explaining a structure of a second heat dissipation layer, and FIG. 4C is a conceptual view for explaining characteristics of detecting a change in capacitance using a hole of the second heat dissipation layer.

Referring to FIG. 4A, the components of the second touch screen 300*b* according to the present embodiment are substantially the same as the components of the first touch screen 300*a* of FIG. 3A, except for the second heat dissipation layer 332. Therefore, the same reference numerals are given to the same components, and redundant explanations are replaced with the explanations of FIGS. 3A and 3B.

Referring to FIG. 4A, the second touch screen 300*b* according to the present embodiment includes the first heat dissipation layer 331 and the second heat dissipation layer 332 disposed between the first heat dissipation layer 331 and the pressure sensing layer 341. The first heat dissipation layer 331 may conduct heat evenly to the entire area of the second heat dissipation layer 332.

The second heat dissipation layer 332 may be formed of a copper layer. The second heat dissipation layer 332 is formed of a metal material and conducts heat discharged from the display module 310 to another area to lower a temperature of the display module 310. That is, heat diffused by the first heat dissipation layer 331 is conducted to the second heat dissipation layer 332 in contact with the first heat dissipation layer 331 so as to be conducted to the case, the frame, and the like, forming an appearance and an internal structure of the mobile terminal 100.

Referring to FIGS. 4B and 4C, a second heat dissipation layer 332a according to the present embodiment includes a plurality of holes h. The plurality of holes (h) may be regularly arranged in substantially the same shape. An air layer is formed in the hole h, and with the air layer formed in the holes h and the first heat dissipation layer 331 overlapping the air layer interposed therebetween, the pressure sensing layer 341 senses a change in capacitance formed between the ground layer 342 and the pressure sensing layer 341.

Although not specifically shown, the second heat dissipation layer 332a may further include a dielectric material filling the holes h. No capacitance is generated in a region where the second heat dissipation layer 332a formed of a metal is disposed. Therefore, a change in capacitance of the region where the holes are formed may be sensed.

The shape, size, and number of the holes are not limited to those shown in FIG. 4B, and the size of the holes may be set according to the size of the display unit of the mobile terminal and the degree of heat generated thereby. Since the holes are formed to effectively dissipate heat generated by the display module 310 by means of the second heat dissipation layer 332, a change in capacitance according to deformation of the first heat dissipation layer 331 may be sensed.

Figure 5A:
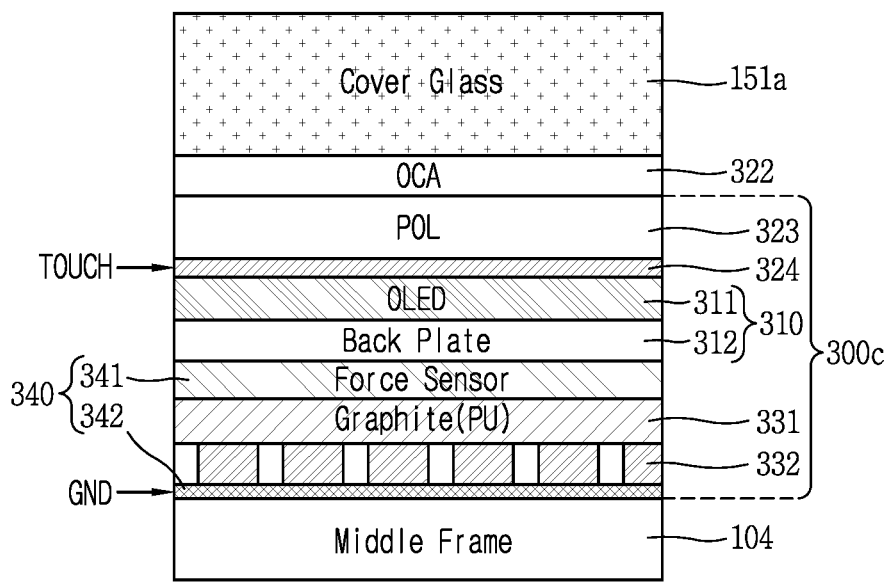
FIGS. 5A to 5C are conceptual views illustrating a touch screen according to another embodiment of the present disclosure.
Figure 5B:
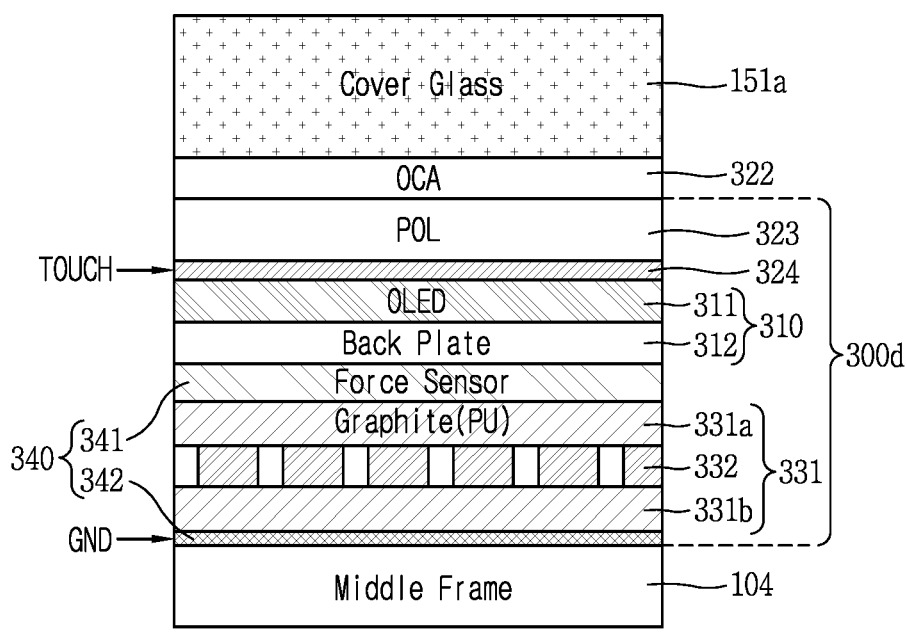
Figure 5C:
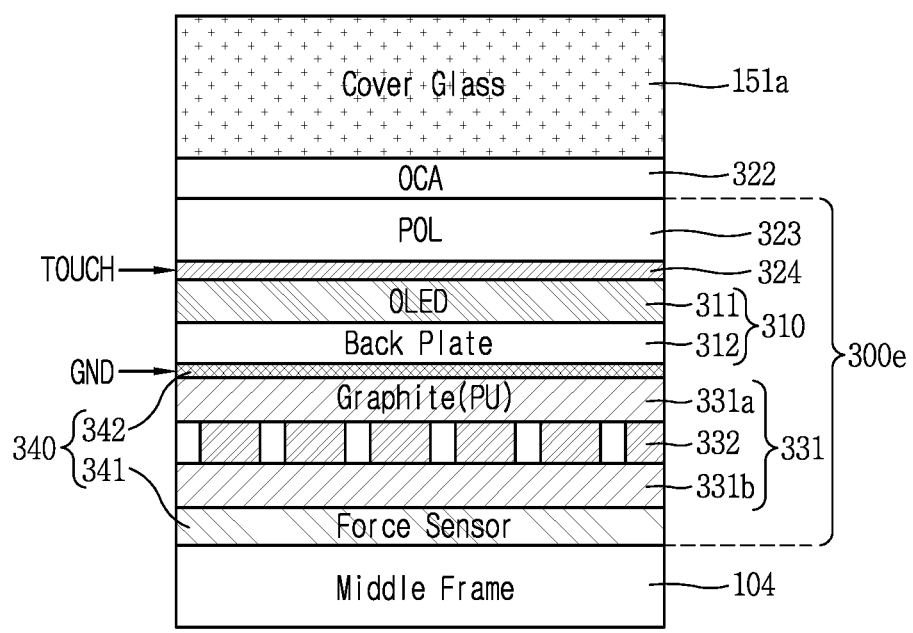

FIGS. 5A to 5C are conceptual views illustrating a touch screen according to another embodiment of the present disclosure. Referring to FIG. 5A, components of a third touch screen 300c according to the present embodiment are substantially the same as those of the first touch screen 330a of FIG. 3A, except for an arrangement structure of the pressure sensing layer 341 and the ground layer 342. Therefore, the same reference numerals are assigned to the same components and redundant explanations are replaced with those of FIG. 3A.

Referring to FIGS. 3A and 5A, the ground layer 342 and the pressure sensing layer 341 are spaced apart from each other with the first and second heat dissipation layers 331 and 332 interposed therebetween. Here, the ground layer 342 may be disposed adjacent to the internal frame 104, or when the internal frame 104 is formed of a metal, a region of the internal frame 104 overlapping the pressure sensing layer 341 may be implemented as a ground layer.

The second heat dissipation layer 332, the first heat dissipation layer 331, and the pressure sensing layer 341 are sequentially stacked on the ground layer 342. The display module 310 is disposed on the pressure sensing layer 341.

When a pressure touch input having a pressure equal to or higher than a specific reference pressure value is applied to the window 151a, the first heat dissipation layer 331 is deformed together with the display module 310 and the pressure sensing layer 341. Accordingly, a distance between the pressure sensing layer 341 and the ground layer 342 is reduced, so that a change in capacitance may be detected.

According to the present disclosure, since the ground layer 342 does not need to be formed of a deformable material and may be implemented as a region of the internal frame, the thickness may be minimized.

Referring to FIG. 5B, components of a fourth touch screen 300d according to the present embodiment are substantially the same as those of the first touch screen 300a of FIG. 3A, except for a first heat dissipation layer 331 including first and second heat dissipation members 331a and 331b. Therefore, the same reference numerals are assigned to the same components, and redundant explanations are replaced with those of FIG. 3A.

Referring to FIGS. 3A and 5B, the first heat dissipation layer 331 includes the first and second heat dissipation members 331a and 331b. The first and second heat dissipation members 331a and 331b may be formed of the same material and have the same thickness, but are not limited thereto.

The first and second heat dissipation members 331a and 331b are disposed with the second radiation layer 332 interposed therebetween. The pressure sensing layer 341 is disposed above the first radiating member 331a and the ground layer 342 is disposed below the second radiating member 331b.

When the thickness of the first and second heat dissipation members 331a and 331b decreases on the basis of a pressure touch input applied on the window 151a, a change in capacitance is detected by the pressure sensing layer 341.

Since the first and second heat dissipating members 331a and 331b are disposed, a deformation range may be expanded by pressure, while improving a heat dissipation effect and an impact alleviation effect. Therefore, the pressure change included in the pressure touch input may be detected more minutely.

Since the first and second heat dissipation members 331a and 331b are in contact with both surfaces of the second radiation layer 332, heat generated by the display module 310 may be dissipated by the first heat dissipation member 331a and heat generated by other electronic component than the display module 310 may be dissipated by the second heat dissipation member 331b.

Referring to FIG. 5C, components of a fifth touch screen 300e according to the present embodiment are substantially the same as those of the first touch screen 300d of FIG. 5B, except for the arrangement of the pressure sensing layer 341 and the ground layer 342. Therefore, the same reference numerals are assigned to the same components, and redundant explanations are replaced with the explanations of FIG. 5B.

Referring to FIG. 5C, the ground layer 342 is disposed on the first heat dissipation member 331a, and the pressure sensing layer 341 is disposed below the second heat dissipation member 331b. Accordingly, when the ground layer 342 and the first and second heat dissipation layers 331 and 332 are deformed by a pressure touch input, the pressure sensing layer 341 senses a change in capacitance.

Figure 6:
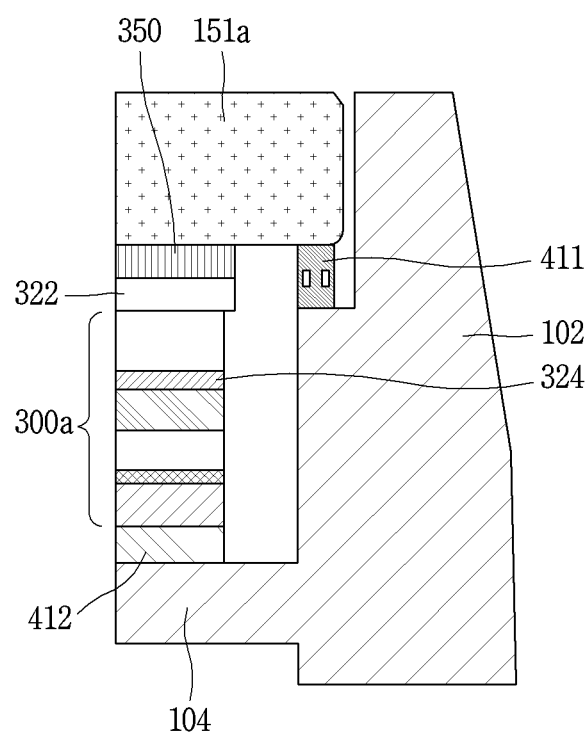
FIG. 6 is a conceptual view illustrating an adhesive member for adhering a window according to an embodiment of the present disclosure.

FIG. 6 is a conceptual view illustrating an adhesive member for attaching a window according to an embodiment of the present disclosure. Referring to FIG. 6, the edge of the window 151a protrudes, relative to the edge of the first touch screen 300a. The edge region of the window 151a is supported by a step region of the rear case 102.

The edge of the window 151a and the rear case 102 are fixed by a first adhesive member 411. The first adhesive member 411 has a specific thickness, and at least one pore is formed therein. Due to the pores of the first adhesive member 411, the first adhesive member 411 may be easily deformed by an external force applied to the window 151a.

Accordingly, even when the width of the first adhesive member 411 adhering the window 151a and the rear case 102 is relatively narrow, the first adhesive member 411 is deformed by an external force applied to the window 151a, and thus, a problem that the window 151a and the rear case 102 are separated from an adhered state may be prevented.

A second adhesive member 412 to be adhered to the internal frame 104 may be formed below the first touch screen 300a. Accordingly, the first touch screen 300a may be prevented from being separated from the internal frame according to deformation of some components of the first touch screen 300a.

Due to the first and second adhesive members 411 and 412, a problem that the first touch screen 300a and the window 151a are separated from the case of the mobile terminal 100 although an external force is applied may be prevented. Meanwhile, a deco film 350 may be formed between the window 151a and the adhesive layer 322. The deco film 350 may prevent a problem that light is reflected from the window 151a.

Figure 7:
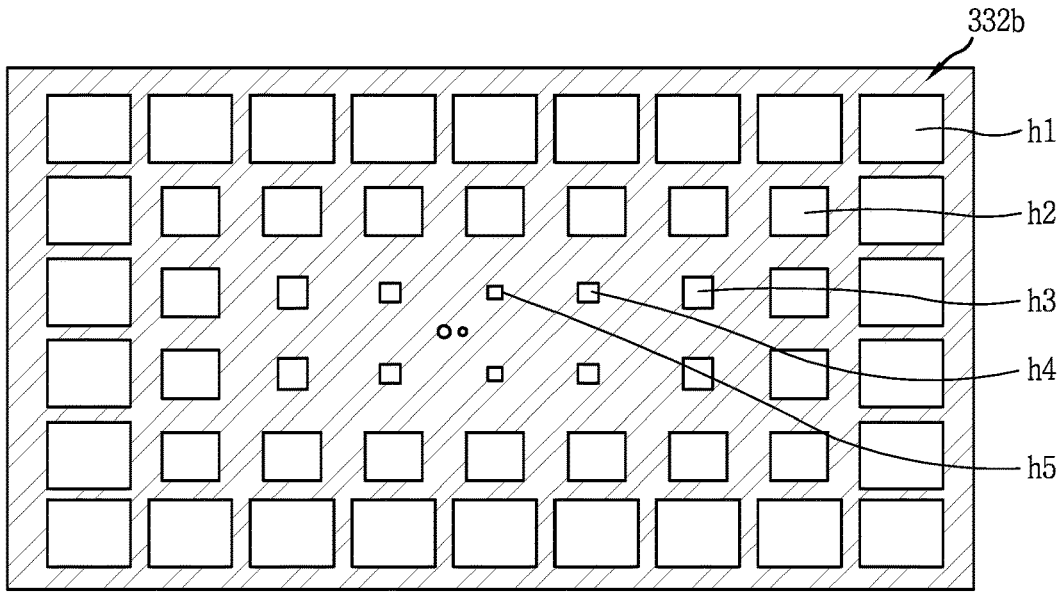
FIG. 7 is a conceptual view for explaining a structure of a second heat dissipation layer according to another embodiment.

FIG. 7 is a conceptual view for explaining a structure of a second heat dissipation layer according to another embodiment. The second heat dissipation layer 332b according to the present embodiment includes a plurality of holes having different sizes. For example, the second heat dissipation layer 332b may include a plurality of first holes h1, a plurality of second holes h2, a plurality of third holes h3, a plurality of fourth holes h4, and a plurality of fifth holes h5.

The first to fifth holes h1, h2, h3, h4, and h5 have different sizes. That is, the sizes gradually decrease from the first hole h1 to the fifth hole h5. The plurality of first holes h1 are formed along the edges of the second heat dissipation layer 332b. The plurality of second holes h2 are formed closer to the central region o of the second heat dissipation layer 332b than the second holes h2, and the plurality of fourth and fifth holes are formed to be closer to the central region o than the plurality of third holes h3.

Accordingly, a change in capacitance may be sensed relatively more sensitively at the edge region of the pressure sensing layer 341 forming the touch screen. Accordingly, even when displacement deformed is relatively small, compared with pressure applied to the edge of the touch screen due to the fixing of the window 151a to the rear case 102, since the edge region of the second heat dissipation layer 332b is formed to be relatively large, pressure may be more sensitively sensed. However, the size and shape of the holes are not limited to those shown in FIG. 7 and may be formed as continuous holes.

According to the present embodiment, the hole area is formed to be larger toward the edge, while securing the area of the second heat dissipation layer 332b for dissipating heat, so that the change in capacitance may be sensitively sensed even at the edge. Accordingly, a pressure touch input may be sensed with substantially the same sensitivity in all areas of the touch screen.

Figure 8A:
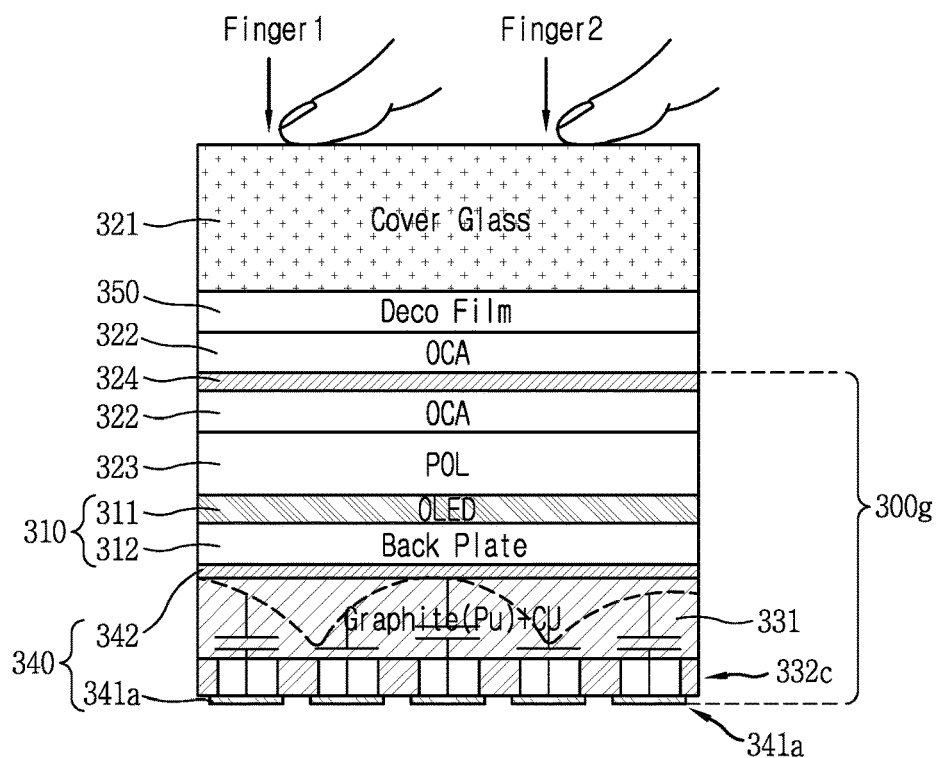
FIGS. 8A to 8C are conceptual views illustrating a structure of a touch screen for sensing a multi-pressure touch input according to another embodiment of the present disclosure.
Figure 8B:
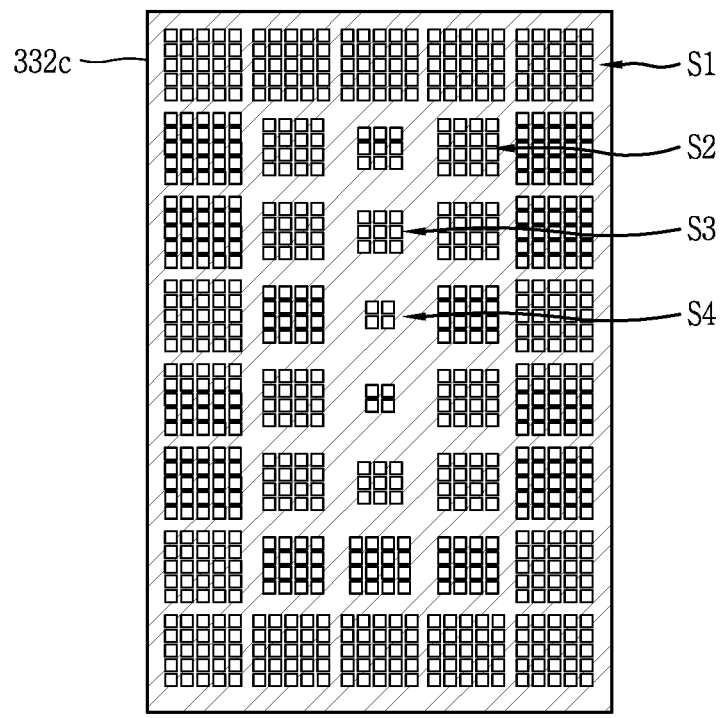
Figure 8C:
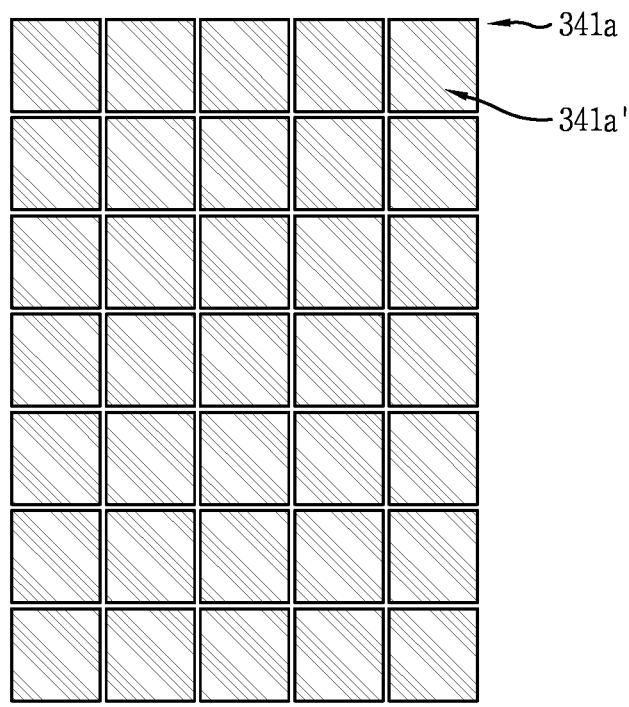

FIGS. 8A and 8C are conceptual views illustrating a structure of a touch screen for sensing a multi-pressure touch input according to another embodiment of the present disclosure. The touch screen according to the present embodiment includes the touch sensing layer 324 adhered to the polarizing layer 323 by an adhesive member 322 and includes the display module 310 including the OLED layer 311 and the back plate 312 under the polarizing layer 323. The ground layer 342 is disposed below the back plate 312.

The ground layer 342 and a pressure sensing layer 341a are spaced apart from each other with the first heat dissipation layer 331 and the second heat dissipation layer 332c interposed therebetween. When multiple pressure touch inputs are applied to different areas on the window 151a, the pressure sensing part 340 according to the present disclosure separately senses the respective pressure touch inputs.

Referring to FIG. 8B, the second heat dissipation layer 332c includes a plurality of first to fourth hole sets S1, S2, S3, and S4 formed of a plurality of holes. For example, the plurality of first hole sets 51 include N holes. The plurality of first hole sets 51 are formed along the edges of the second heat dissipation layer 332c.

The plurality of second hole sets S2 include the number of holes smaller than N, and the number of holes constituting the third hole set S3 and the fourth hole set S4 is gradually reduced. The holes forming the plurality of first to fourth hole sets S1, S2, S3, and S4 may have substantially the same shape. A hole set including a smaller number of holes is formed toward a central region of the second heat dissipation layer 332c.

For example, the first hole set S2 including 25 holes is disposed adjacent to the edge of the second heat dissipation layer 332c, and the fourth hole set S4 including four holes is disposed at a central region of the second heat dissipation layer 332c.

In the case of a plurality of smaller holes, a region where capacitance is formed is formed using fine holes, while securing a heat dissipation area of the second heat dissipation layer 332c for heat transmission, whereby a change in capacitance may be more minutely sensed.

FIG. 8C illustrates the pressure sensing layer 341a which overlaps the second heat dissipation layer 332c of FIG. 8B. The pressure sensing layer 341a is divided into a plurality of sensor regions, and a slit portion 341a' for separating the plurality of sensor regions is formed.

The plurality of sensor regions are formed to correspond to the plurality of hole sets of the second heat dissipation layer 332c, respectively. FIGS. 8B and 8C show that the plurality of sensor regions are formed to have substantially the same size, but the present disclosure is not limited thereto. The sensor regions may be formed to be different in size and shape. However, it is preferable that the holes are arranged to overlap the sensor regions.

That is, the one sensor region may detect a change in capacitance independently from other sensor regions. Accordingly, the pressure sensing layer 341a including the plurality of sensor regions may sense a region where the pressure touch input is applied by the sensor region where capacitance is changed. Also, even when pressure touch inputs are applied to a plurality of different regions, a pressure of the pressure touch input applied to each region may be sensed.

However, the touch screen according to another embodiment of the present disclosure may include the pressure sensing layer 341a of FIG. 8C and the second heat dissipation layer 332b of FIG. 7 or include the pressure sensing layer 341a of FIG. 8C and the second heat dissipation layer 332a of FIG. 4B.

According to the present embodiment, the coordinates on the window 151a to which a pressure touch input has been applied may be sensed without using touch coordinates sensed by the touch sensing layer 324, and even when a plurality of pressure touch inputs have different pressures, individual pressures may be sensed. Therefore, since it is not necessary to calculate touch input values of the pressure touch inputs using the sensing result sensed by the touch sensing layer 324, the pressure touch inputs may be more accurately sensed and the different pressures of the plurality of different regions may be sensed, thereby controlling various functions.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The present disclosure provides the mobile terminal in which the ground layer and the pressure sensing layer are separated using the heat dissipation layer disposed to dissipate heat discharged from the OLED module and the pressure sensing layer may sense a pressure touch input according to deformation of the heat dissipation layer based on pressure of a pressure touch input. Thus, the present disclosure may be utilized in various relevant industrial fields.

What is claimed is:

1. A mobile terminal comprising:
a window;
a touch screen sensing a touch input applied to the window and outputting visual information; and
an internal frame supporting a lower portion of the touch screen,
wherein the touch screen comprises:
a display module outputting the visual information;
at least one heat dissipation layer disposed below the display module to dissipate heat; and
a pressure sensing part including a ground layer and a pressure sensing layer spaced apart from each other with the at least one heat dissipation layer interposed therebetween and to sense a pressure of the touch input based on a change in capacitance according to a deformation of the at least one heat dissipation layer while the touch input is being applied, and
wherein the ground layer is adjacent to the display module or the internal frame,
wherein the at least one heat dissipation layer includes:
a first heat dissipation layer; and
a second heat dissipation layer overlapping the first heat dissipation layer,
wherein the second heat dissipation layer includes a plurality of holes to generate a capacitance between the ground layer and the pressure sensing layer, and
wherein the second heat dissipation layer further includes a dielectric material charged in the plurality of holes.

2. The mobile terminal of claim 1, wherein the first heat dissipation layer includes a material deformable by an external force and the second heat dissipation layer includes a metal material for heat conduction.

3. The mobile terminal of claim 1, wherein the plurality of holes have substantially a same shape and are regularly arranged on the second heat dissipation layer.

4. The mobile terminal of claim 1, wherein the plurality of holes have different sizes, and sizes of the plurality of holes are reduced toward a center of the second heat dissipation layer.

5. The mobile terminal of claim 1, wherein the second heat dissipation layer includes a plurality of hole sets including the plurality of holes, and numbers of holes included in the plurality of hole sets are different.

6. The mobile terminal of claim 1, wherein the touch screen includes a touch sensor layer sensing coordinates of the touch input applied to the window.

7. The mobile terminal of claim 1, wherein the pressure sensing layer includes a plurality of sensor regions divided to independently sense the change in the capacitance.

8. The mobile terminal of claim 7, wherein at least one region of the sensor regions overlaps the holes.

9. The mobile terminal of claim 2, wherein the first heat dissipation layer includes a graphite material and/or polyurethane (PU) material, and the first heat dissipation layer includes first and second heat dissipation members facing each other with the second heat dissipation layer interposed therebetween.

10. The mobile terminal of claim 1, further comprising:
a case supporting the window; and
an adhesive member adhering an edge region of the window and the case,
wherein the adhesive member includes pores formed therein and is deformed by an external force.

11. The mobile terminal of claim 10, further comprising:
an additional adhesive member contacting the internal frame and a lower portion of the touch screen.

12. The mobile terminal of claim 1, wherein the display module includes an Organic Light Emitting Diode (OLED) layer and a back plate supporting the OLED layer.

13. The mobile terminal of claim 12, wherein the back plate forms an appearance of the OLED layer and supports a lower surface and a side surface of the OLED layer to prevent deformation.

14. The mobile terminal of claim 12, wherein the back plate includes metal.

15. The mobile terminal of claim 12, wherein the ground layer is disposed directly between the back plate and the at least one heat dissipation layer.

16. The mobile terminal of claim 12, wherein the ground layer is disposed directly adjacent to the internal frame.

17. The mobile terminal of claim 16, wherein the first heat dissipation layer is disposed directly between the pressure sensing layer and the back plate and the second heat dissipation layer is disposed directly between the first heat dissipation layer and the ground layer.

18. The mobile terminal of claim 17, wherein a thickness of the second heat dissipation layer is greater than a thickness of the first heat dissipation layer.

* * * * *